US011921780B2

(12) United States Patent
Agarwal et al.

(10) Patent No.: US 11,921,780 B2
(45) Date of Patent: *Mar. 5, 2024

(54) SYSTEMS AND METHODS FOR MODIFYING SPELLING OF A LIST OF NAMES BASED ON A SCORE ASSOCIATED WITH A FIRST NAME

(71) Applicant: Rovi Product Corporation, San Jose, CA (US)

(72) Inventors: Vineet Agarwal, Andover, MA (US); Shakir Sharfraz Ashfaq Ahamed, Bengaluru (IN)

(73) Assignee: Rovi Product Corporation, San Jose, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/356,040

(22) Filed: Jun. 23, 2021

(65) Prior Publication Data

US 2021/0319061 A1 Oct. 14, 2021

Related U.S. Application Data

(63) Continuation of application No. 15/585,539, filed on May 3, 2017, now Pat. No. 11,074,290.

(51) Int. Cl.
| | |
|---|---|
| *G06F 16/68* | (2019.01) |
| *G06F 16/40* | (2019.01) |
| *G06F 16/483* | (2019.01) |
| *G06F 16/638* | (2019.01) |
| *G06F 40/232* | (2020.01) |

(52) U.S. Cl.
CPC .............. *G06F 16/68* (2019.01); *G06F 16/40* (2019.01); *G06F 16/483* (2019.01); *G06F 16/638* (2019.01); *G06F 40/232* (2020.01)

(58) Field of Classification Search
CPC ........ G06F 16/68; G06F 16/40; G06F 16/638; G06F 40/232
See application file for complete search history.

(56) References Cited

U.S. PATENT DOCUMENTS

| | | | | |
|---|---|---|---|---|
| 9,401,947 | B1* | 7/2016 | Oztaskent | ............... G06F 16/40 |
| 9,524,526 | B2* | 12/2016 | Ajmera | ................... G06Q 50/01 |
| 2004/0229199 | A1* | 11/2004 | Ashley | ..................... G09B 7/00 |
| | | | | 434/323 |
| 2007/0250468 | A1* | 10/2007 | Pieper | ................. G06F 16/9535 |
| | | | | 707/999.001 |
| 2010/0306249 | A1* | 12/2010 | Hill | ..................... G06F 16/9535 |
| | | | | 707/769 |

(Continued)

*Primary Examiner* — Pavan Mamillapalli
(74) *Attorney, Agent, or Firm* — Lerner David LLP

(57) ABSTRACT

Systems and methods are disclosed herein for modifying the spelling of a list of names based on a score associated with a first name. The systems and methods may receive a media asset, determine a first source of data corresponding to the media asset, and receive, from the first source of data, a list of names, each name in the list of names being associated with a respective copy of the media asset. The systems and methods may generate a reduced list of names, retrieve a criterion from storage, determine a set of scores corresponding to each name from the reduced list of names based on the criterion, select a first name from the reduced list of names based on the set of scores, and modify the spelling of a second name in the list of names based on the first name.

20 Claims, 8 Drawing Sheets

(56) References Cited

U.S. PATENT DOCUMENTS

| | | | |
|---|---|---|---|
| 2015/0310011 A1* | 10/2015 | Poulet | G06F 16/433 |
| | | | 707/722 |
| 2016/0014151 A1* | 1/2016 | Prakash | H04L 47/62 |
| | | | 726/22 |
| 2016/0335339 A1* | 11/2016 | Venkataraman | G06F 16/78 |
| 2016/0378762 A1* | 12/2016 | Rohter | G06F 16/285 |
| | | | 707/728 |
| 2017/0061356 A1* | 3/2017 | Haas | G06Q 10/06316 |

* cited by examiner

US 11,921,780 B2

SYSTEMS AND METHODS FOR MODIFYING SPELLING OF A LIST OF NAMES BASED ON A SCORE ASSOCIATED WITH A FIRST NAME

CROSS-REFERENCE TO RELATED APPLICATIONS

This application is a continuation of U.S. patent application Ser. No. 15/585,539, filed May 3, 2017, which is hereby incorporated by reference herein in its entirety.

BACKGROUND

In related art systems, the misspelled title of a media asset is corrected using a dictionary. To do this, typical systems replace the misspelled title of the media asset with the title as suggested by a dictionary. These typical systems, though, fail to consider the fact that artists often pick innovative/creative titles for their tracks that include wordplays and intentional misspelling of words.

SUMMARY

Systems and methods are provided herein for modifying the spelling of a list of names based on a score associated with a specific name. The media guidance application may receive a media asset and determine a source of data that contains the media asset. For example, the media guidance application may determine that the web-page AllMusic.com has several copies of the song "Everybody's Talkin'" by song artist Fred Neil available. The media guidance application may receive, from the source of data, a list of names, each name associated with a copy of the media asset. For example, the media guidance application may receive a list of names from AllMusic.com for the "Everybody's Talkin'" song containing seven repetitions of "Everybody's Talkin'" names, two repetitions of "Everybody's Talking" names, and one repetition of "Everybody's Talkin" name.

Further, the media guidance application may generate a reduced list of names. The media guidance application may include only one repetition of each distinct name from the initial list in the reduced list. For example, the media guidance application may generate the reduced list to comprise "Everybody's Talkin'," "Everybody's Talking," and "Everybody's Talkin." Further, the media guidance application may generate a score for each of the names from the reduced list based on a criterion. For example, the media guidance application may use number of views, date of publication, number of likes or any other criterion. The media guidance application may modify the spelling of the other names based on the name with the highest score. For example, the media guidance application may rank the name "Everybody's Talkin'" the highest because the copies of the media asset associated with this name have the most cumulative number of views. For example, the media guidance application may modify the remaining names to be "Everybody's Talkin'." For example, the media guidance application may modify the name "Everybody's Talkin" to be "Everybody's Talkin'."

In some aspects, the media guidance application may automatically identify potential candidates for title correction and the corrected title candidate. The media guidance application may thus allow the content editors to deal with only a few thousand tracks shortlisted by the method instead of millions of entries.

In some aspects, the media guidance application may aggregate the tracks with similar titles by the same artist under a song and the identify all the track titles whose spelling differs from the most frequent title under that song. For example, the media guidance application may identify that the online music guide AllMusic.com has ten entries of the song "Everybody's Talkin'" by song artist Fred Neil. The media guidance application may identify seven "Everybody's Talkin'" titles, two "Everybody's Talking" titles, and one "Everybody's Talkin" title. The media guidance application may identify the corrected title to be "Everybody's Talkin'" because it is the most frequent title. The media guidance application may consider the other two spellings as wrong and will recommend the most frequent title as the potential corrections. A significant advantage of this method is that it allows for the correct title to be identified even when the correct title contains intentionally introduced spelling errors. For example, if a dictionary were used to identify the correct title then the title "Everybody's Talking" would have been picked and the title "Everybody's Talkin'" would have been marked as wrong. Another advantage of this method is that it will bring down the required manpower and time to fix the errors in any music catalog.

In some aspects, the media guidance application may receive a media asset. For example, the media guidance application may receive the song "Everybody's Talkin'" by the song artist Fred Neil. The media guidance application may determine a first source of data corresponding to the media asset. For example, the media guidance application may determine that several copies of the song "Everybody's Talkin'" are available from the source AllMusic.com. The media guidance application may receive, from the first source of data, a list of names, each name in the list of names being associated with a respective copy of the media asset. For example, the media guidance application may receive a list of names from AllMusic.com for the copies of the "Everybody's Talkin'" song containing seven "Everybody's Talkin'" names, two "Everybody's Talking" names, and one "Everybody's Talkin" name. Each of the names is associated with a copy of the media asset, i.e., it is the name of the copy of the media asset as featured in the first source.

In some embodiments, after receiving the list of names from the first source, the media guidance application may generate a reduced list of names by retaining one name of each identically spelled name in the list of names. For example, the media guidance application may generate the reduced list comprising only the names "Everybody's Talkin'," "Everybody's Talking," and "Everybody's Talkin." The media guidance application may retrieve a criterion from storage. For example, the media guidance application may retrieve a criterion such as the number of views from storage. Other examples of criteria are the date of publication, the publisher, the number of likes, the number of comments, and the like.

In some embodiments, after generating the reduced list of names, the media guidance application may, for each given name in the reduced list of names, identify a plurality of copies of the media asset associated with the given name. For example, the media guidance application may identify the seven media asset copies that are associated with the name "Everybody's Talkin'," two copies that are associated with the name "Everybody's Talking," and one copy associated with the name "Everybody's Talkin". The media guidance application may generate a copy score for each of the identified plurality of copies of the media asset based on the criterion. For example, the media guidance application may determine the number of views for each copy. The media guidance application may assign a score to the given name based on the generated copy scores. For example, the media guidance application may sum the number of views that the media asset copies associated with the name "Everybody's Talkin'" received, to compute the score corresponding to the name "Everybody's Talkin'." The media guidance application may select a first name from the reduced list of names based on the score assigned to the first name. For example, the media guidance application may select the name "Everybody's Talkin'" because it has the highest score. The media guidance application may modify the spelling of a second name in the list of names based on the first name. For example, the media guidance application may modify the spelling of the name "Everybody's Talkin" to be "Everybody's Talkin'."

In some embodiments, in order to determine the first source of data corresponding to the media asset, the media guidance application may retrieve a threshold number from the storage. For example, the media guidance application may retrieve a threshold number of five from the storage. The media guidance application may determine a number of respective copies of the media asset available on the first source. For example, the media guidance application may determine that AllMusic.com has ten copies of the song "Everybody's Talkin'." For example, some of the copies can have different quality, be uploaded by different users, or be modifications of the media asset. The media guidance application may determine that the number of respective copies of the media asset available on the first source is greater than the threshold number. For example, the media guidance application may determine that there are more copies for the song "Everybody's Talkin'" on AllMusic.com than the threshold number and therefore determine AllMusic.com as the first source.

In some embodiments, in order to generate the reduced list of names by retaining one name of each identically spelled name in the list of names, the media guidance application may, for each second given name in the list of names, determine whether the second given name is in the reduced list of names. For example, the media guidance application may conclude that the name "Everybody's Talkin" is not in the reduced list of names. The media guidance application may, in response to determining that the second given name is not in the reduced list of names, include the second given name in the reduced list of names. The media guidance application may place the name "Everybody's Talkin" in the reduced list of names.

In some embodiments, in order to generate the reduced list of names by retaining one name of the each identically spelled name in the list of names, the media guidance application may determine a second source of data corresponding to the media asset. For example, the media guidance application may determine the web-page SoundCloud.com as the second source. The media guidance application may receive, from the second source of data, a second list of names, each name in the list of names being associated with a respective copy of the media asset. The media guidance application may receive, from SoundCloud.com, a second list of names for the "Everybody's Talkin'" song containing ten "Everybody's Talkin'" names, two "Everybody's Talking" names, and one "Everybody's Talkin" name. The media guidance application may generate the reduced list of names by retaining one name of each identically spelled name in the list of names and second list of names. For example, the media guidance application may generate a reduced list of names comprising the name "Everybody's Talkin'," the name "Everybody's Talkin'," the name "Everybody's Talking," and the name "Everybody Talkin."

In some embodiments, in order retrieve the criterion from storage, the media guidance application may determine a first set of criteria corresponding to the first source. For example, the media guidance application may determine that AllMusic.com tracks the number of views, the number of comments, and the number of likes for its content. The media guidance application may determine a second set of criteria corresponding to the media asset. For example, the media guidance application may determine that copies of the song "Everybody's Talkin'" have a number of views, a number of likes but the comments are disabled for all of its corresponding copies. The media guidance application may retrieve a third set of criteria from the storage. For example, the media guidance application may retrieve the criteria being the number of views and the number of comments. The media guidance application may determine that the first set of criteria, the second set of criteria, and the third set of criteria include the criterion. For example, the media guidance application may determine that the number of views is a criterion available on AllMusic.com, available for the copies of the song "Everybody's Talkin'" and available in storage and thus determine that the number of views is an appropriate criterion.

In some embodiments, in order to identify the plurality of copies of the media asset associated with the given name, the media guidance application may retrieve a set of names in the list of names, based on the given name. For example, the media guidance application may retrieve seven names "Everybody's Talkin'," two names "Everybody's Talking," and one name "Everybody's Talkin." The media guidance application may determine the plurality of copies of the media asset associated with the given name from the set of names. For example, the media guidance application may determine the seven copies associated with the name "Everybody's Talkin'," two copies associated with the name "Everybody's Talking," and one copy associated with the name "Everybody's Talkin."

In some embodiments, in order to generate the copy score for each of the identified plurality of copies of the media asset based on the criterion, the media guidance application may retrieve a baseline criterion from the storage associated with the criterion. For example, the media guidance application may retrieve a baseline criterion dictating, that if a copy has less than a hundred views, then the copy is awarded a score of zero and if the copy has one hundred views or more, then the copy is awarded a score equal to the number of views. For each given copy from the identified plurality of copies of the media asset, the media guidance application may retrieve metadata associated with the given copy. For example, the media guidance application may retrieve the metadata associated with the copy associated with the name "Everybody's Talkin." The media guidance application may generate the copy score based on the metadata, the baseline criterion, and the criterion. For example, the media guidance application may determine that the respective copy has three hundred views and award a copy score of three hundred.

In some embodiments, in order to assign the score to the given name based on the generated copy scores, the media guidance application may select a subset of scores based on the generated copy scores. For example, the media guidance application may select the top 30% of copy scores associated with each given name. The media guidance application may assign the score to the given name based on the subset of scores. For example, the media guidance application may only use the selected copy scores to compute the score for a given name.

In some embodiments, in order to select the first name from the reduced list of names based on the score assigned to the name, the media guidance application may select a third name from the reduced list of names based on the score assigned to the name. For example, the media guidance application may select "Everybody's Talking," in addition to selecting the name "Everybody's Talkin'". For example, the media guidance application may select these two names because they have the same or similar scores. The media guidance application may generate for display a first selectable option for a user, wherein selecting the first selectable option selects the first name. For example, the media guidance application may display a selectable option for the name "Everybody's Talkin'"; selecting this first option may allow the user to indicate that "Everybody's Talkin'" is the correct spelling of the name associated with the media asset. The media guidance application may generate for display a second selectable option for the user, wherein selecting the second selectable option selects the third name. For example, the media guidance application may display a selectable option for the name "Everybody's Talking"; selecting this second option may allow the user to indicate that "Everybody's Talking" is the correct spelling of the name associated with the media asset. The media guidance application may receive an indication that the user selected the first selectable option. For example, the media guidance application may receive indication that the user selected the first selectable option, indicating that the name "Everybody's Talkin'" is the correct spelling of the name associated with the media asset.

In some embodiments, in order to modify the spelling of the second name in the list of names based on the first name, the media guidance application may retrieve a threshold score from the storage. For example, the media guidance application may retrieve a threshold score of 400 from the storage. The media guidance application may determine the second name based on the score assigned to the second name and the threshold score. For example, the media guidance application may only correct the names that have a score lower than the threshold score. For example, the media guidance application may determine the second name to be "Everybody's Talkin" because it was assigned a score of 300, which is lower than the threshold score of 400. In some implementations, the media guidance application may consult the user before correcting the names with scores higher that the threshold score.

It should be noted that the systems, methods, apparatuses, and/or aspects described above may be applied to, or used in accordance with, other systems, methods, apparatuses, and/or aspects described in this disclosure.

BRIEF DESCRIPTION

The above and other objects and advantages of the disclosure will be apparent upon consideration of the following detailed description, taken in conjunction with the accompanying drawings, in which like reference characters refer to like parts throughout, and in which.

Figure 9:
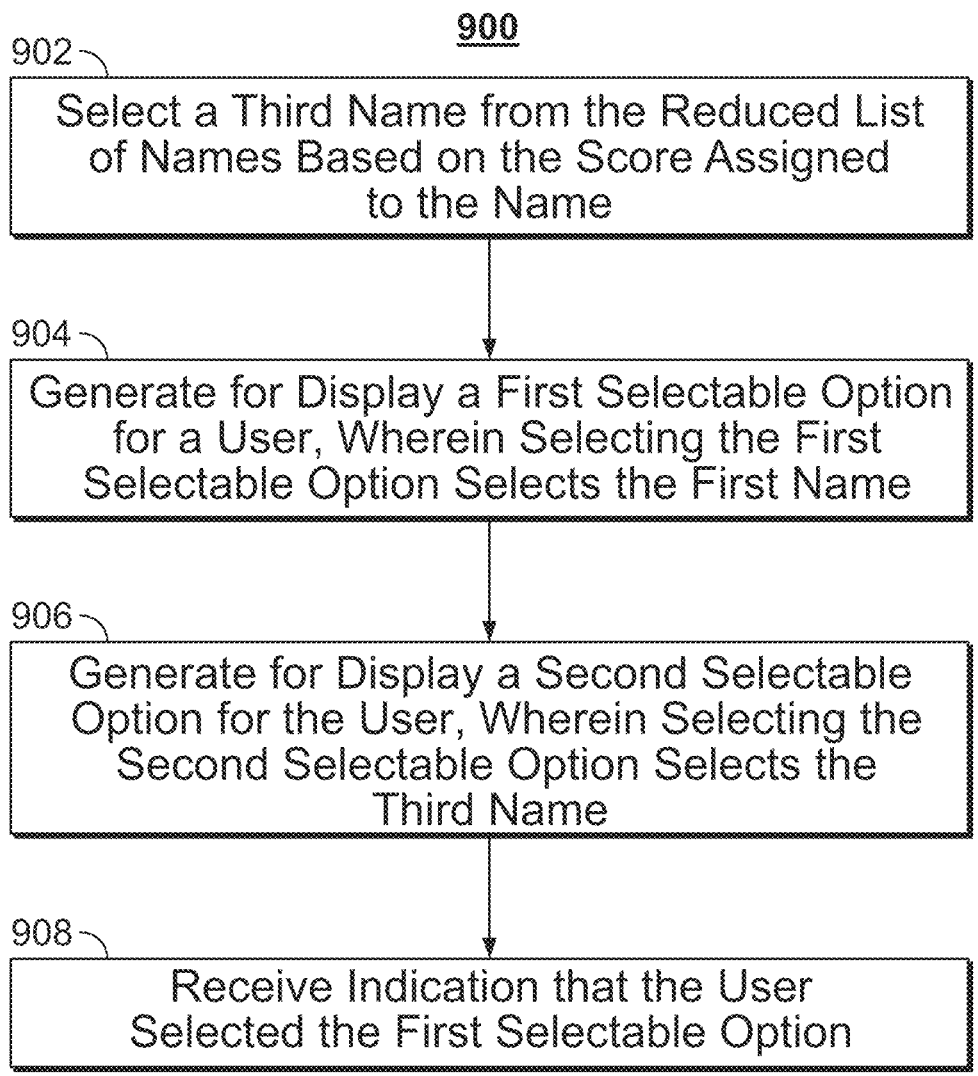
Figure 10:
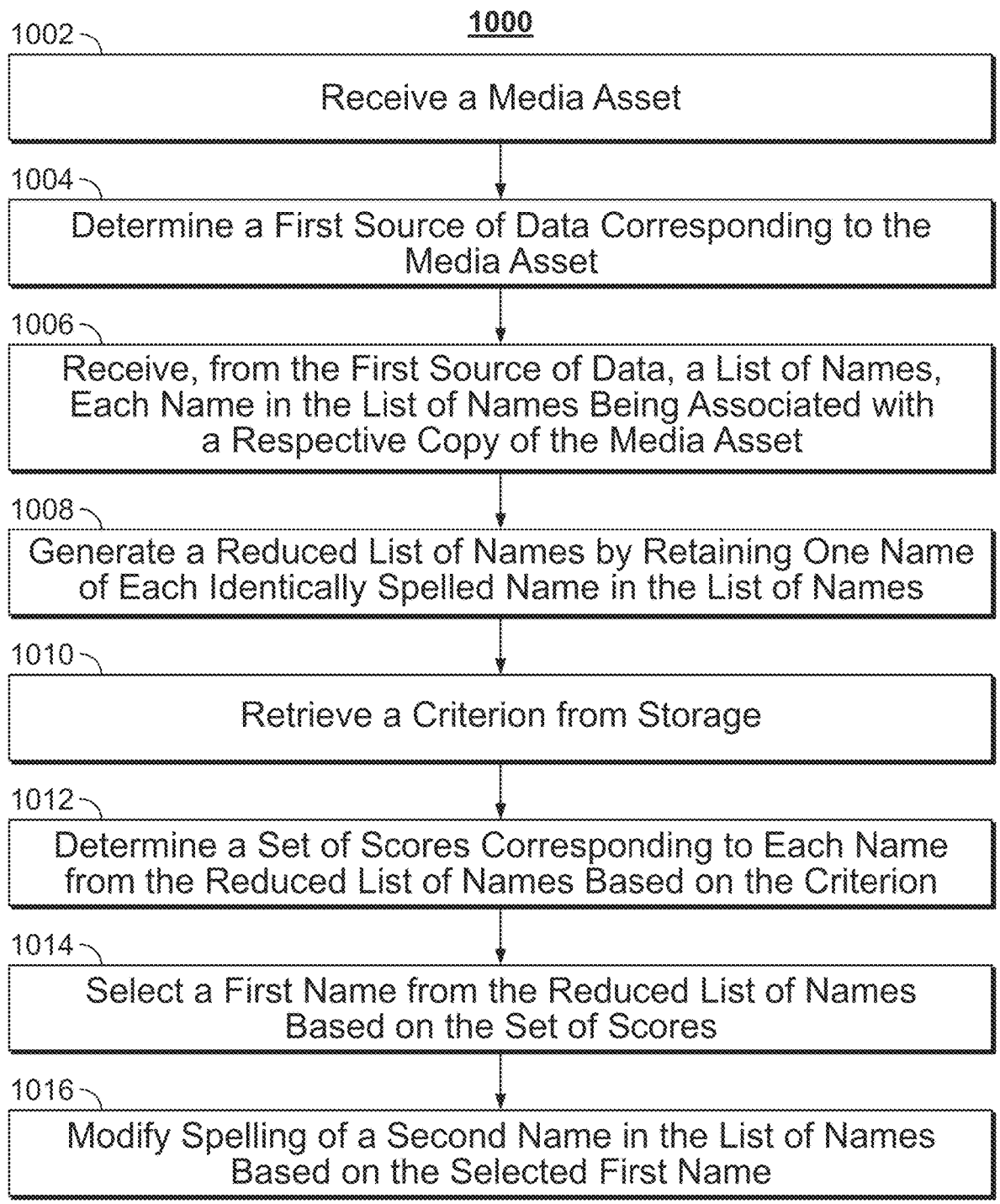

FIG. 9 depicts an illustrative flowchart of a process for selecting the first name from the reduced list of names based on the score assigned to the name, in accordance with some embodiments of the disclosure; and FIG. 10 depicts another illustrative flowchart of a process for modifying spelling of a list of names based on a score associated with a first name, in accordance with some embodiments of the disclosure.

DETAILED DESCRIPTION

Systems and methods are provided herein for modifying spelling of a list of names based on a score associated with a specific name. The media guidance application may receive a media asset and determine a source of data that contains the media asset. For example, the media guidance application may determine that the web-page AllMusic.com has several copies of the song "Everybody's Talkin'" by song artist Fred Neil available. The media guidance application may receive, from the source of data, a list of names, each name associated with a copy of the media asset. For example, the media guidance application may receive a list of names from AllMusic.com for the "Everybody's Talkin'" song containing seven repetitions of "Everybody's Talkin'" names, two repetitions of "Everybody's Talking" names, and one repetition of "Everybody's Talkin" name.

Further, the media guidance application may generate a reduced list of names. The media guidance application may include only one repetition of each distinct name from the initial list in the reduced list. For example, the media guidance application may generate the reduced list to comprise "Everybody's Talkin'," "Everybody's Talking," and "Everybody's Talkin." Further, the media guidance application may generate a score for each of the names from the reduced list based on a criterion. For example, the media guidance application may use number of views, date of publication, number of likes or any other criterion. The media guidance application may modify the spelling of the other names based on the name with the highest score. For example, the media guidance application may rank the name "Everybody's Talkin'" the highest because the copies of the media asset associated with this name have the most cumulative number of views. For example, the media guidance application may modify the remaining names to be "Everybody's Talkin'." For example, the media guidance application may modify the name "Everybody's Talkin" to be "Everybody's Talkin'."

In some aspects, the media guidance application may automatically identify potential candidates for title correction and the corrected title candidate. The media guidance application may thus allow the content editors to deal with only a few thousand tracks shortlisted by the method instead of millions of entries.

In some aspects, the media guidance application may aggregate the tracks with similar titles by the same artist under a song and the identify all the track titles whose spelling differs from the most frequent title under that song. For example, the media guidance application may identify that the online music guide AllMusic.com has ten entries of the song "Everybody's Talkin'" by song artist Fred Neil. The media guidance application may identify seven "Everybody's Talkin'" titles, two "Everybody's Talking" titles, and one "Everybody's Talkin" title. The media guidance application may identify the corrected title to be "Everybody's Talkin'" because it is the most frequent title. The media guidance application may consider the other two spellings as wrong and will recommend the most frequent title as the potential corrections. A significant advantage of this method is that it allows for the correct title to be identified even when the correct title contains intentionally introduced spelling errors. For example, if a dictionary were used to identify the correct title then the title "Everybody's Talking" would have been picked and the title "Everybody's Talkin'" would have been marked as wrong. Another advantage of this method is that it will bring down the required manpower and time to fix the errors in any music catalog.

Figure 1:
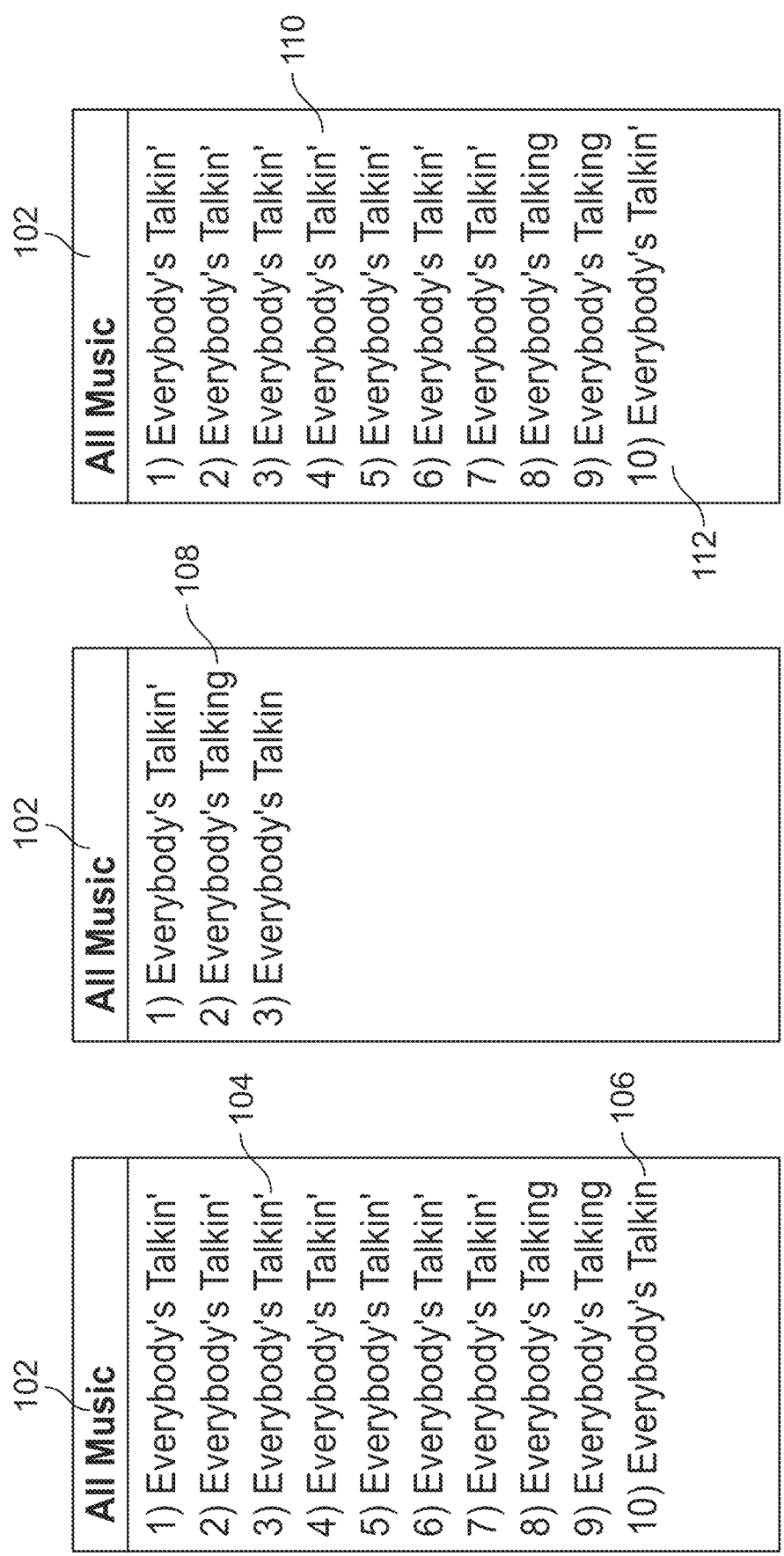
FIG. 1A shows an illustrative embodiment of a display screen for modifying spelling of a list of names based on a score associated with a first name, comprising the list of names, in accordance with some embodiments of the disclosure.
FIG. 1B shows another illustrative embodiment of a display screen for modifying spelling of a list of names based on a score associated with a first name, comprising a reduced list of names, in accordance with some embodiments of the disclosure.
FIG. 1C shows yet another illustrative embodiment of a display screen for modifying spelling of a list of names based on a score associated with a first name, comprising a modified list of names, in accordance with some embodiments of the disclosure.

FIG. 1A shows an illustrative embodiment of a display screen for modifying spelling of a list of names based on a score associated with a first name, comprising the list of names, in accordance with some embodiments of the disclosure. As depicted, FIG. 1A includes a first source 102, a list of names 104, and a second name 106. The media guidance application may generate for display first source 102 and list of names 104, including second name 106.

FIG. 1B shows another illustrative embodiment of a display screen for modifying spelling of a list of names 104 based on a score associated with a first name, comprising a reduced list of names 108, in accordance with some embodiments of the disclosure. As depicted, FIG. 1B includes first source 102 and a reduced list of names 108. The media guidance application may generate for display first source 102 and reduced list of names 108.

FIG. 1C shows yet another illustrative embodiment of a display screen for modifying spelling of a list of names 104 based on a score associated with a first name, comprising a modified list of names 110, in accordance with some embodiments of the disclosure. As depicted, FIG. 1C includes first source 102, modified list of names 110, and first name 112. The media guidance application may generate for display first source 102, modified list of names 110, and first name 112. The media guidance application may generate modified list of names 110 to be list of names 104 with second name 106 replaced with first name 112.

In some aspects, the media guidance application may receive a media asset. For example, the media guidance application may receive the song "Everybody's Talkin'" by the song artist Fred Neil. For example, the media guidance application may receive the media asset from storage 408, media content source 516, or advertisement source 524. The media guidance application may receive the media asset through paths 520 or 526. The media guidance application may receive the media asset in response to submitting a query from the media guidance application or without submitting a query.

The media guidance application may determine first source 102 of data corresponding to the media asset. For example, the media guidance application may determine that several copies of the song "Everybody's Talkin'" are available from the source AllMusic.com. The media guidance application may receive a list of first sources from storage 408, media content source 516, or advertisement source 524. The media guidance application may then determine first source 102 from the received list.

The media guidance application may receive, from first source 102 of data, list of names 104, each name in list of names 104 being associated with a respective copy of the media asset. For example, the media guidance application may receive list of names 104 from AllMusic.com for the copies of the "Everybody's Talkin'" song containing seven "Everybody's Talkin'" names, two "Everybody's Talking" names, and one "Everybody's Talkin" name. Each of the names is associated with a copy of the media asset, i.e., it is the name of the copy of the media asset as featured in first source 102.

As used herein, the term "name" is defined to mean a title of a media asset. As used herein, the term "copy" is defined to mean a digital or analog media asset that is identical or similar in content to the original media asset. All the copies are media assets by the same artist that authored the original media asset. Some copies can have different quality, name, be uploaded by different users, or be modifications of the original media asset, however all of the copies are productions by the same artist that produced the original media asset. For example, there may be multiple copies of the song "Everybody's Talkin'" by Fred Neil. For example, the copies can be uploaded by different users, have different qualities, or names however all the copies of the song "Everybody's Talkin'" are authored by Fred Neil.

In some embodiments, after receiving list of names 104 from first source 102, the media guidance application may generate reduced list of names 108 by retaining one name of each identically spelled name in list of names 104. For example, the media guidance application may generate the reduced list comprising only the names "Everybody's Talkin'," "Everybody's Talking," and "Everybody's Talkin." The media guidance application may retrieve a criterion from storage. For example, the media guidance application may retrieve a criterion such as the number of views from storage. Other examples of criteria are the date of publication, the publisher, the number of likes, the number of comments, and the like. The criterion can be a combination of any of the criteria listed above.

In some embodiments, after generating reduced list of names 108, the media guidance application may, for each given name in reduced list of names 108, identify a plurality of copies of the media asset associated with the given name. For example, the media guidance application may identify the seven media asset copies that are associated with the name "Everybody's Talkin'," two copies that are associated with the name "Everybody's Talking," and one copy associated with the name "Everybody's Talkin". The media guidance application may generate a copy score for each of the identified plurality of copies of the media asset based on the criterion. For example, the media guidance application may determine the number of views for each copy.

In some embodiments, the media guidance application may generate the copy score based on the date of publication. For example, the media guidance application may determine when the media asset was first published. The media guidance application may assign a score to the copy proportional to the difference between the date of the first publishing and the date of the publishing of the copy.

In some embodiments, the media guidance application may generate the copy score based on the publisher. For example, the media guidance application may determine the original publisher of the media asset. In some embodiments, the media guidance application may assign a score of zero to the copy if the copy publisher is not the original publisher. In some embodiments, if the publisher is not the original publisher, the media guidance application may determine how many media assets the original publisher and the copy publisher published together. The media guidance application may assign a score to the copy proportional to the number of common tracks between the original publisher and the copy publisher.

The media guidance application may assign a score to the given name based on the generated copy scores. For example, the media guidance application may sum the number of views that the media asset copies associated with the name "Everybody's Talkin'" received, to compute the score corresponding to the name "Everybody's Talkin'."

The media guidance application may select first name 112 from reduced list of names 108 based on the score assigned to the first name. For example, the media guidance application may select the name "Everybody's Talkin'" because it has the highest score. The media guidance application may select the name with the lowest or the highest score.

The media guidance application may modify the spelling of second name 106 in list of names 104 based on the first name. For example, the media guidance application may modify the spelling of the name "Everybody's Talkin" to be "Everybody's Talkin'."

In some embodiments, in order to determine first source 102 of data corresponding to the media asset, the media guidance application may retrieve a threshold number from the storage. For example, the media guidance application may retrieve a threshold number of five from the storage. The media guidance application may determine a number of respective copies of the media asset available on first source 102. For example, the media guidance application may determine that AllMusic.com has ten copies of the song "Everybody's Talkin'." For example, some of the copies can have different quality, be uploaded by different users, or be modifications of the media asset. The media guidance application may determine that the number of respective copies of the media asset available on first source 102 is greater than the threshold number. For example, the media guidance application may determine that there are more copies for the song "Everybody's Talkin'" on AllMusic.com than the threshold number and therefore determine AllMusic.com as first source 102.

In some embodiments, if the media guidance application determines that the number of respective copies of the media asset available on first source 102 is less than the threshold number, the media guidance application may select a second source as described below.

In some embodiments, in order to generate reduced list of names 108 by retaining one name of each identically spelled name in list of names 104, the media guidance application may, for each second given name in list of names 104, determine whether the second given name is in reduced list of names 108. For example, the media guidance application may conclude that the name "Everybody's Talkin" is not in reduced list of names 108. The media guidance application may, in response to determining that the second given name is not in reduced list of names 108, include the second given name in reduced list of names 108. The media guidance application may place the name "Everybody's Talkin" in reduced list of names 108.

In some embodiments, in order to generate reduced list of names 108 by retaining one name of the each identically spelled name in list of names 104, the media guidance application may determine a second source of data corresponding to the media asset. For example, the media guidance application may determine the web-page SoundCloud.com as the second source. The media guidance application may receive, from the second source of data, a second list of names, similar to list of names 104, each name in the second list of names being associated with a respective copy of the media asset. The media guidance application may receive, from SoundCloud.com, a second list of names for the "Everybody's Talkin'" song containing ten "Everybody's Talkin'" names, two "Everybody's Talking" names, and one "Everybody's Talkin" name. The media guidance application may generate reduced list of names 108 by retaining one name of each identically spelled name in list of names 104 and a second list of names. For example, the media guidance application may generate reduced list of names 108 comprising the name "Everybody's Talkin'," the name "Everybody's Talkin'," the name "Everybody's Talking," and the name "Everybody Talkin." In some embodiments, the media guidance application may keep track of how many copies correspond to each name. In some embodiments, the media guidance application may keep track of which copies correspond to each name.

In some embodiments, in order to retrieve the criterion from storage, the media guidance application may determine a first set of criteria corresponding to first source 102. For example, the media guidance application may determine that AllMusic.com tracks the number of views, the number of comments, and the number of likes for its content. The media guidance application may determine a second set of criteria corresponding to the media asset. For example, the media guidance application may determine that copies of the song "Everybody's Talkin'" have a number of views, a number of likes, but the comments are disabled for all of its corresponding copies. The media guidance application may retrieve a third set of criteria from the storage. For example, the media guidance application may retrieve the criteria being the number of views and the number of comments. The media guidance application may determine that the first set of criteria, the second set of criteria, and the third set of criteria include the criterion. For example, the media guidance application may determine that the number of views is a criterion available on AllMusic.com, available for the copies of the song "Everybody's Talkin'" and available in storage and thus determine that the number of views is an appropriate criterion.

In some embodiments, the media guidance application may determine that only two sets of the first set of criteria, the second set of criteria, and the third set of criteria include the criterion.

In some embodiments, in order to identify the plurality of copies of the media asset associated with the given name, the media guidance application may retrieve a set of names in list of names 104, based on the given name. For example, the media guidance application may retrieve seven names "Everybody's Talkin'," two names "Everybody's Talking," and one name "Everybody's Talkin." The media guidance application may determine the plurality of copies of the media asset associated with the given name from the set of names. For example, the media guidance application may determine the seven copies associated with the name "Everybody's Talkin'," two copies associated with the name "Everybody's Talking," and one copy associated with the name "Everybody's Talkin."

In some embodiments, in order to generate the copy score for each of the identified plurality of copies of the media asset based on the criterion, the media guidance application may retrieve a baseline criterion from the storage associated with the criterion. For example, the media guidance application may retrieve a baseline criterion dictating that, if a copy has less than a hundred views, then the copy is awarded a score of zero, and, if the copy has one hundred views or more, then the copy is awarded a score equal to the number of views. For each given copy from the identified plurality of copies of the media asset, the media guidance application may retrieve metadata associated with the given copy. For example, the media guidance application may retrieve the metadata associated with the copy associated with the name "Everybody's Talkin." The media guidance application may generate the copy score based on the metadata, the baseline criterion, and the criterion. For example, the media guidance application may determine that the respective copy has three hundred views and award a copy score of three hundred.

In some embodiments, the media guidance application may generate the copy score based on the date of publication. The media guidance application may retrieve a baseline criterion that is the original date of the publication. The media guidance application may generate the copy score to be proportional to the difference between the original date of publication and the date of publication of the copy.

In some embodiments, the media guidance application may generate the copy score based on the publisher. The media guidance application may retrieve a baseline criterion that is the original publisher. The media guidance application may generate the copy score based on the number of media assets that the original publisher and the copy publisher published together.

In some embodiments, in order to assign the score to the given name based on the generated copy scores, the media guidance application may select a subset of scores based on the generated copy scores. For example, the media guidance application may select the top 30% of copy scores associated with each given name. The media guidance application may assign the score to the given name based on the subset of scores. For example, the media guidance application may only use the selected copy scores to compute the score for a given name.

In some embodiments, the media guidance application may select the subset to be the subset with the lowest or highest scores.

In some embodiments, in order to select first name 112 from reduced list of names 108 based on the score assigned to the name, the media guidance application may select a third name from reduced list of names 108 based on the score assigned to the name. For example, the media guidance application may select "Everybody's Talking," in addition to selecting the name "Everybody's Talkin'". For example, the media guidance application may select these two names because they have the same or similar scores. The media guidance application may generate for display a first selectable option for a user, wherein selecting the first selectable option selects the first name. For example, the media guidance application may display a selectable option for the name "Everybody's Talkin'"; selecting this first option may allow the user to indicate that "Everybody's Talkin'" is the correct spelling of the name associated with the media asset. The media guidance application may generate for display a second selectable option for the user, wherein selecting the second selectable option selects the third name. For example, the media guidance application may display a selectable option for the name "Everybody's Talking"; selecting this second option may allow the user to indicate that "Everybody's Talking" is the correct spelling of the name associated with the media asset. The media guidance application may receive an indication that the user selected the first selectable option. For example, the media guidance application may receive an indication that the user selected the first selectable option indicating that the name "Everybody's Talkin'" is the correct spelling of the name associated with the media asset.

In some embodiments, in order to modify the spelling of second name 106 in list of names 104 based on the first name, the media guidance application may retrieve a threshold score from the storage 408. For example, the media guidance application may retrieve a threshold score of 400 from the storage 408. The media guidance application may determine second name 106 based on the score assigned to second name 106 and the threshold score. For example, the media guidance application may only correct the names that have a score lower than the threshold score. For example, the media guidance application may determine second name 106 to be "Everybody's Talkin" because it was assigned a score of 300, which is lower than the threshold score of 400. In some implementations, the media guidance application may consult the user before correcting the names with scores higher than the threshold score.

In some embodiments, the media guidance application may select second name 106 that has the score lower, higher, or exactly at the threshold score.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
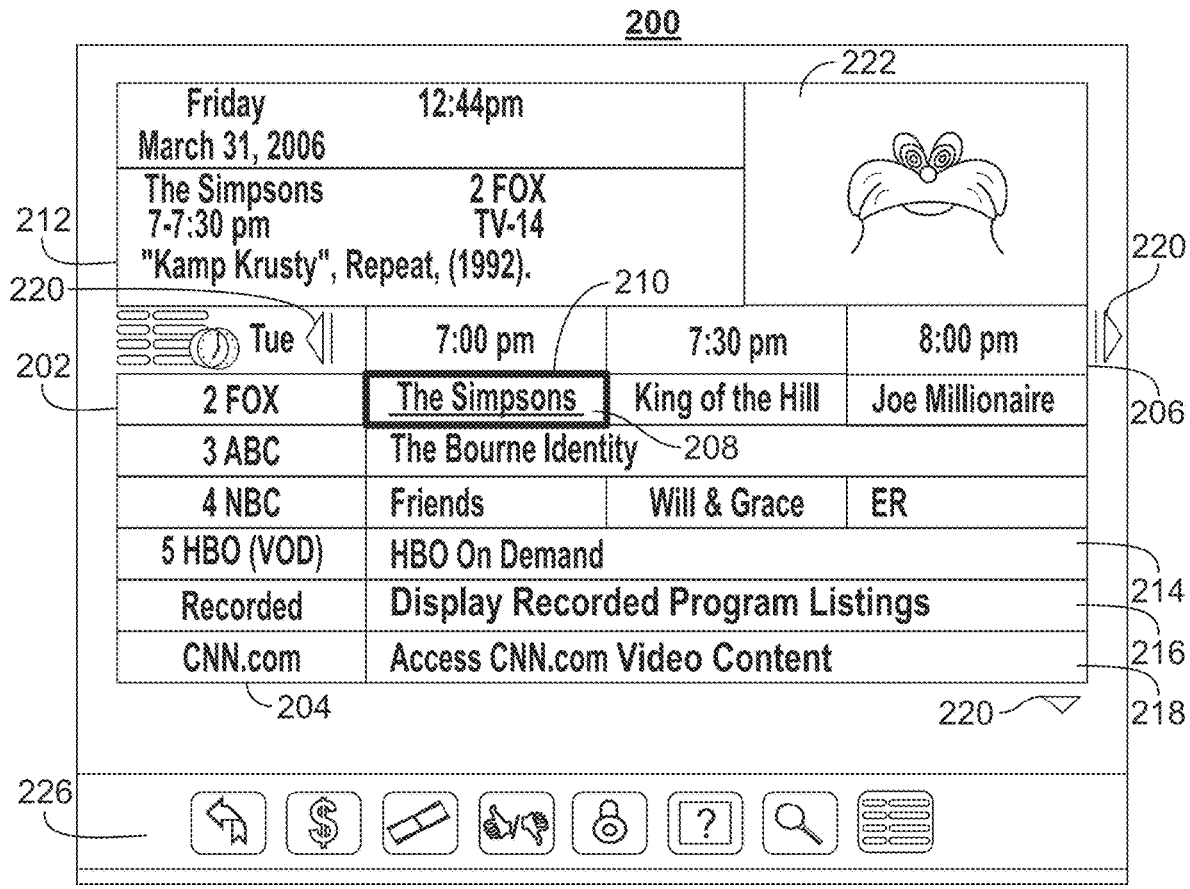
FIG. 2 shows an illustrative embodiment of a display screen that may be used to provide media guidance application listings and other media guidance information, in accordance with some embodiments of the disclosure.
Figure 3:
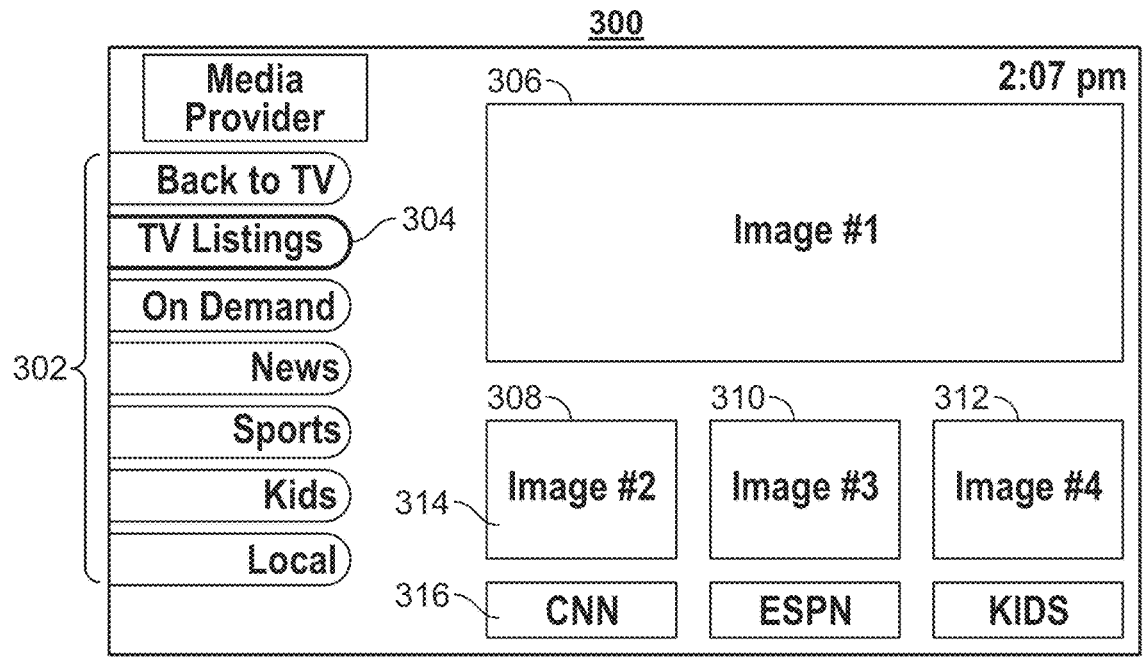
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
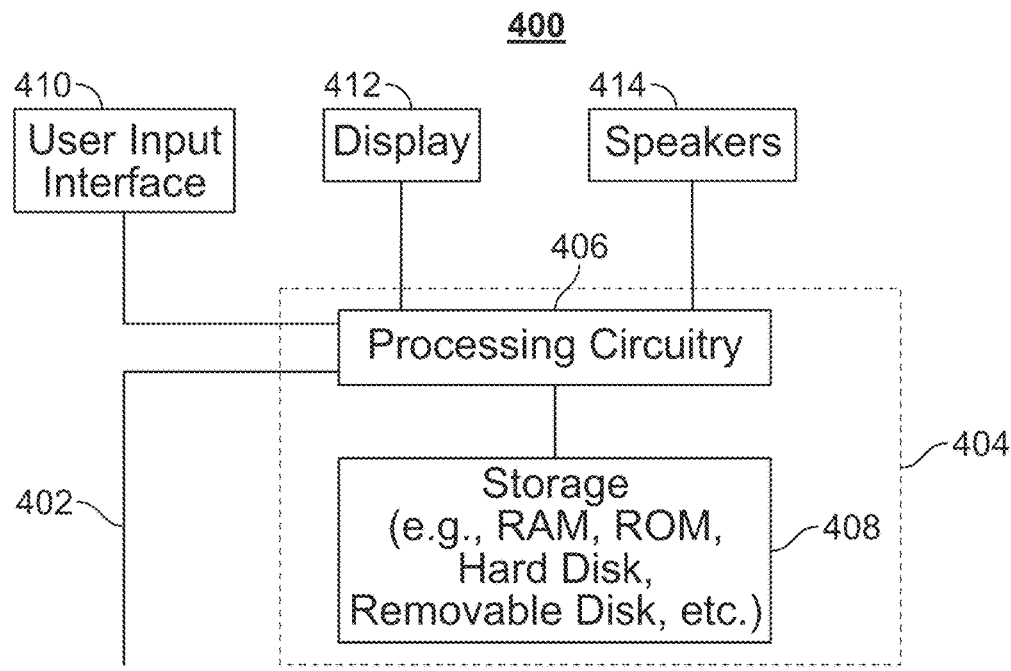
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
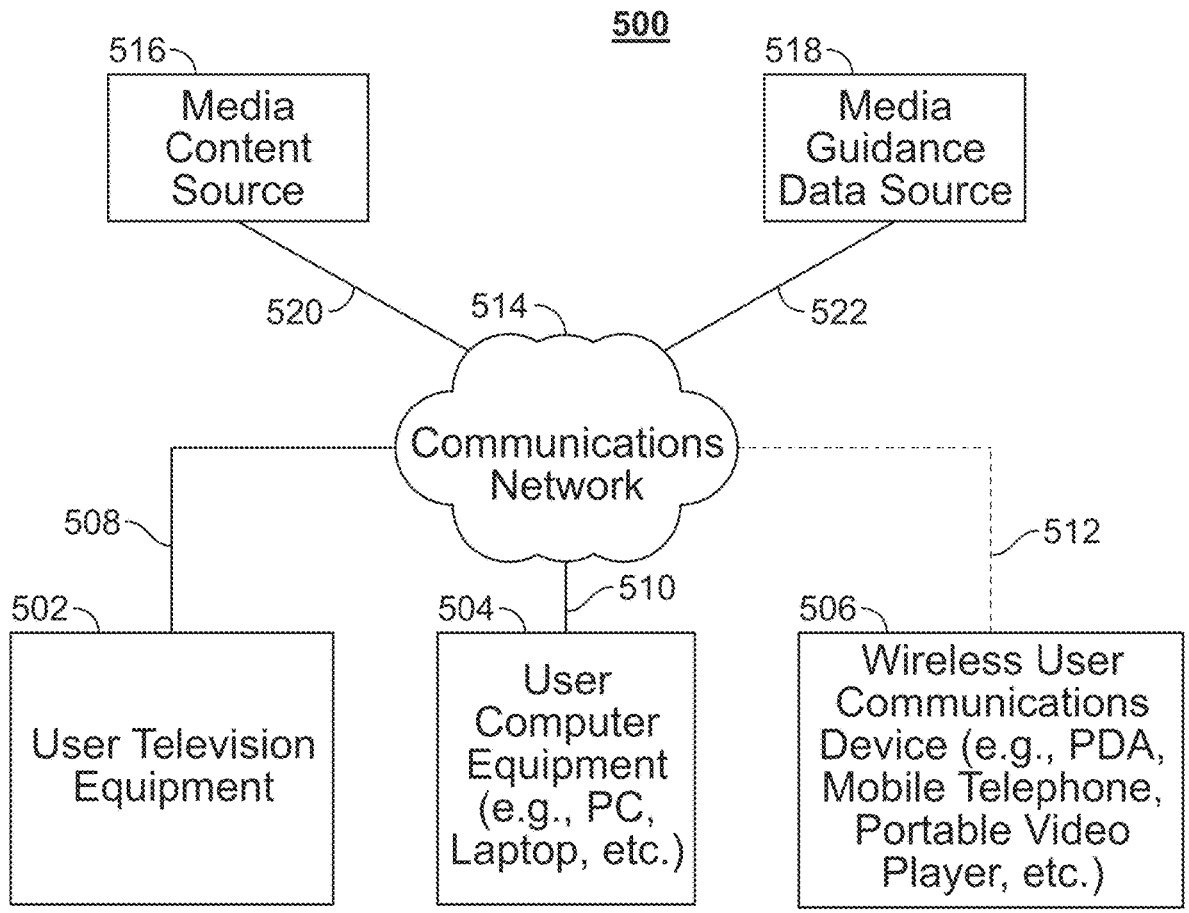
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
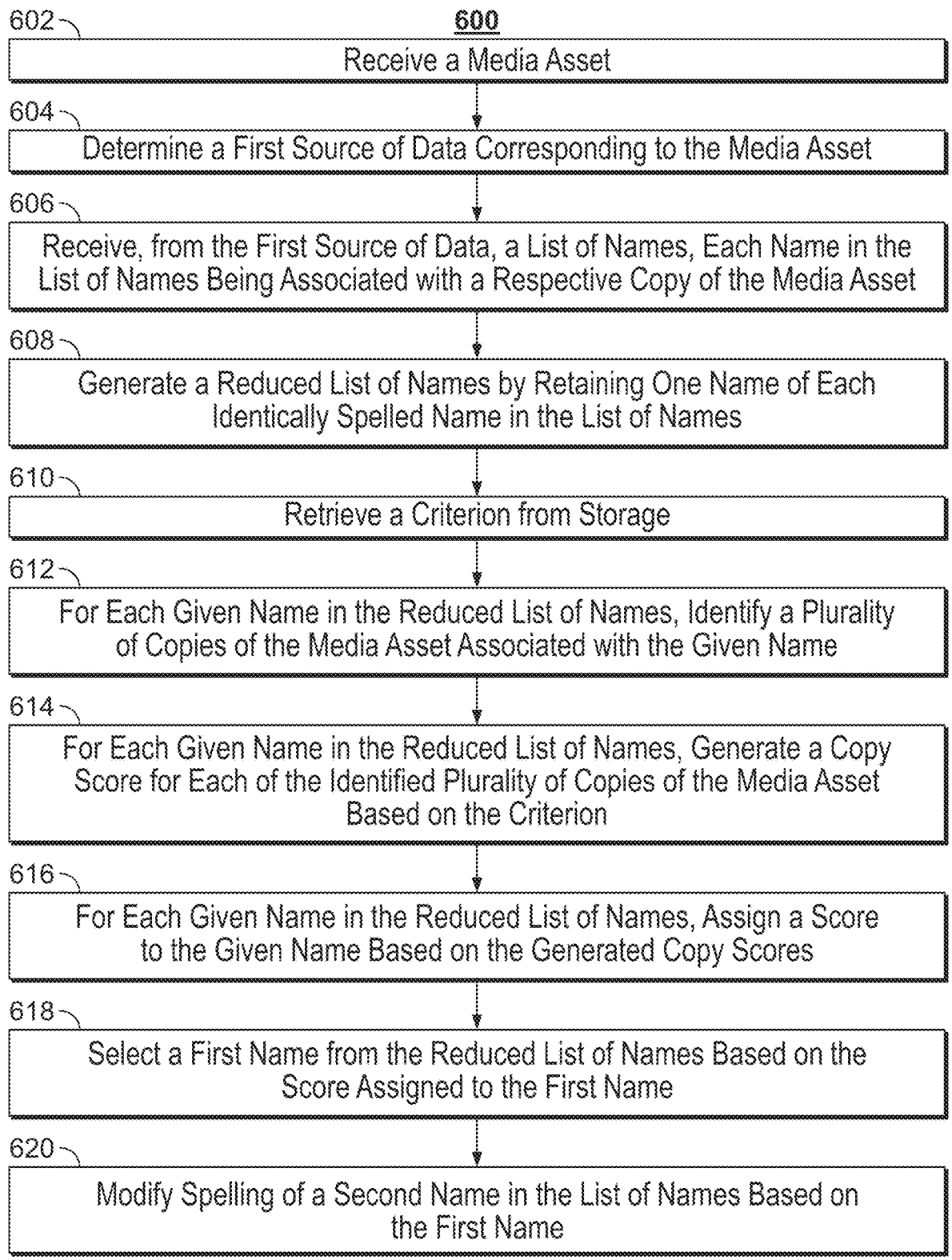
FIG. 6 depicts an illustrative flowchart of a process for modifying spelling of a list of names based on a score associated with a first name, in accordance with some embodiments of the disclosure.

FIG. 6 depicts an illustrative flowchart of a process 600 for modifying spelling of list of names 104 based on a score associated with a first name, in accordance with some embodiments of the disclosure. Process 600 may be executed by control circuitry 404 (e.g., in a manner instructed to control circuitry 404 by the media guidance application). Control circuitry 404 may be part of a remote server separated from the user equipment by way of communications network 514.

Process 600 begins at step 602 when control circuitry 404 receives a media asset. For example, control circuitry 404 may receive the song "Everybody's Talkin'" by the song artist Fred Neil.

At step 604, control circuitry 404 determines first source 102 of data corresponding to the media asset. For example, control circuitry 404 may determine that several copies of the song "Everybody's Talkin'" are available from the source AllMusic.com.

At step 606, control circuitry 404 receives, from first source 102 of data, list of names 104, each name in list of names 104 being associated with a respective copy of the media asset. For example, control circuitry 404 may receive list of names 104 from AllMusic.com for the copies of the "Everybody's Talkin'" song containing seven "Everybody's Talkin'" names, two "Everybody's Talking" names, and one "Everybody's Talkin" name. Each of the names is associated with a copy of the media asset. In particular, each of the names is a name of the copy of the media asset as featured in first source 102. Each name is linked to the respective copy such that selection of the given name causes the respective copy to be retrieved and accessed.

At step 608, control circuitry 404 generates reduced list of names 108 by retaining one name of each identically spelled name in list of names 104. For example, control circuitry 404 may generate the reduced list comprising only the names "Everybody's Talkin'," "Everybody's Talking," and "Everybody's Talkin."

At step 610, control circuitry 404 retrieves a criterion from storage 408. For example, control circuitry 404 may retrieve a criterion such as the number of views from storage 408. Other examples of criteria are the date of publication, the publisher, the number of likes, the number of comments, and the like.

At step 612, for each given name in reduced list of names 108, control circuitry 404 identifies a plurality of copies of the media asset associated with the given name. For example, control circuitry 404 may identify the seven media asset copies that are associated with the name "Everybody's Talkin'," two copies that are associated with the name "Everybody's Talking," and one copy associated with the name "Everybody's Talkin".

At step 614, for each given name in reduced list of names 108, control circuitry 404 generates a copy score for each of the identified plurality of copies of the media asset based on the criterion. For example, control circuitry 404 may determine the number of views for each copy.

At step 616, for each given name in reduced list of names 108, control circuitry 404 assigns a score to the given name based on the generated copy scores. For example, control circuitry 404 may sum the number of views that the media asset copies associated with the name "Everybody's Talkin'" received, to compute the score corresponding to the name "Everybody's Talkin'."

At step 618, control circuitry 404 selects first name 112 from reduced list of names 108 based on the score assigned to the first name. For example, control circuitry 404 may select the name "Everybody's Talkin'" because it has the highest score.

At step 620, control circuitry 404 modifies the spelling of second name 106 in list of names 104 based on the first name. For example, control circuitry 404 may modify the spelling of the name "Everybody's Talkin" to be "Everybody's Talkin'."

Figure 7:
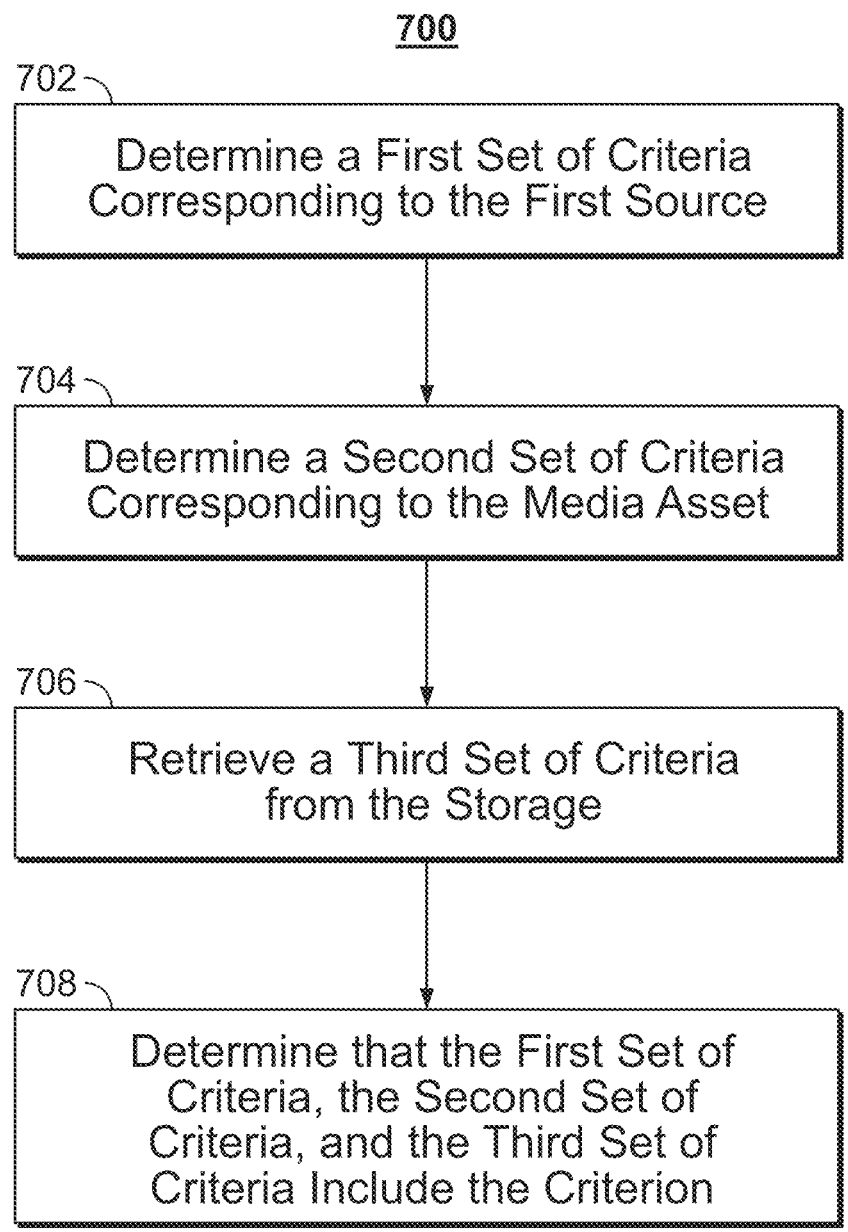
FIG. 7 depicts an illustrative flowchart of a process for retrieving the criterion from storage, in accordance with some embodiments of the disclosure.

FIG. 7 depicts an illustrative flowchart of a process 700 for retrieving the criterion from storage 408, in accordance with some embodiments of the disclosure. Process 700 may be executed by control circuitry 404 (e.g., in a manner instructed to control circuitry 404 by the media guidance application). Control circuitry 404 may be part of a remote server separated from the user equipment by way of communications network 514.

Process 700 begins at step 702 when control circuitry 404 determines a first set of criteria corresponding to first source 102. For example, control circuitry 404 may determine that AllMusic.com tracks the number of views, the number of comments, and the number of likes for its content.

At step 704, control circuitry 404 determines a second set of criteria corresponding to the media asset. For example, control circuitry 404 may determine that copies of the song "Everybody's Talkin'" have a number of views, a number of likes, but the comments are disabled for all of its corresponding copies.

At step 706, control circuitry 404 retrieves a third set of criteria from the storage 408. For example, control circuitry 404 may retrieve the criteria being the number of views and the number of comments.

At step 708, control circuitry 404 determines that the first set of criteria, the second set of criteria, and the third set of criteria include the criterion. For example, control circuitry 404 may determine that the number of views is a criterion available on AllMusic.com, available for the copies of the song "Everybody's Talkin'" and available in storage 408 and thus determine that the number of views is an appropriate criterion.

Figure 8:
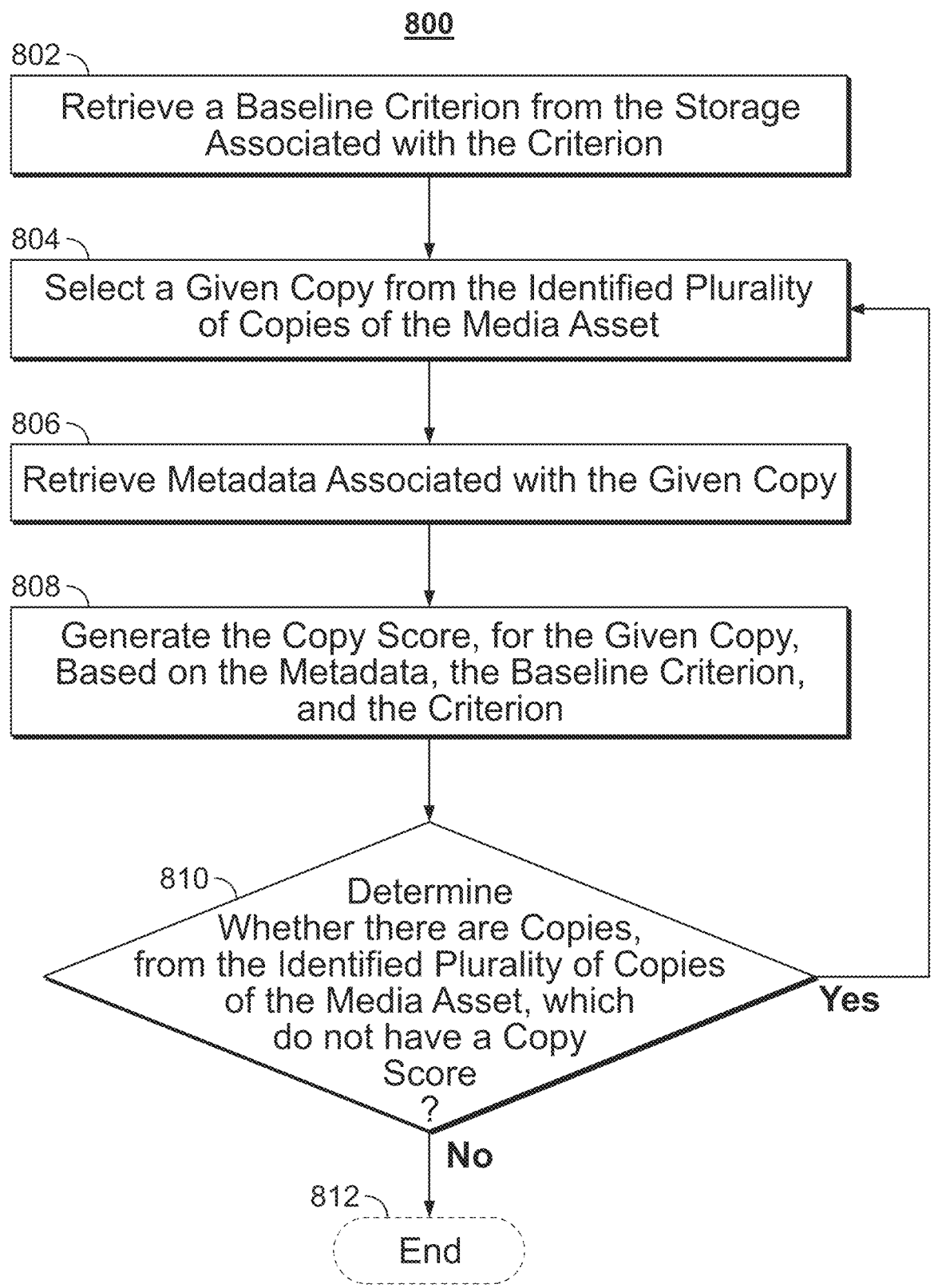
FIG. 8 depicts an illustrative flowchart of a process for generating the copy score for each of the identified plurality of copies of the media asset based on the criterion, in accordance with some embodiments of the disclosure.

FIG. 8 depicts an illustrative flowchart of a process 800 for generating the copy score for each of the identified plurality of copies of the media asset based on the criterion, in accordance with some embodiments of the disclosure. Process 800 may be executed by control circuitry 404 (e.g., in a manner instructed to control circuitry 404 by the media guidance application). Control circuitry 404 may be part of a remote server separated from the user equipment by way of communications network 514.

Process 800 begins at step 802 when control circuitry 404 retrieves a baseline criterion from storage 408 associated with the criterion. For example, the control circuitry 404 may retrieve a baseline criterion dictating that, if a copy has less than a hundred views, then the copy is awarded a score of zero and, if the copy has one hundred views or more, then the copy is awarded a score equal to the number of views.

At step 804, control circuitry 404 selects a given copy from the identified plurality of copies of the media asset. For example, control circuitry 404 may select the copy of the media asset associated with the name "Everybody's Talkin." Control circuitry 404 may query first source 102 in order to receive the given copy. Control circuitry 404 may include the name of the media asset in the query. Control circuitry 404 may retrieve each copy from the identified plurality of copies from a different URL on first source 102. Alternatively, control circuitry 404 may retrieve several copies from the same URL on first source 102.

At step 806, control circuitry 404 retrieves metadata associated with the given copy. For example, control circuitry 404 may retrieve the metadata associated with the copy associated with the name "Everybody's Talkin." Control circuitry 404 may query first source 102 to obtain the metadata associated with the given copy. Alternatively, control circuitry 404 may analyze the given copy and generate the metadata associated with the given copy.

At step 808, control circuitry 404 generates the copy score, for the given copy, based on the metadata, the baseline criterion, and the criterion. For example, control circuitry 404 may determine that the respective copy has three hundred views and award a copy score of three hundred.

At step 810, control circuitry 404 determines whether there are copies, from the identified plurality of copies of the media asset, that do not have a copy score.

If at step 810 control circuitry 404 determines that there are copies from the identified plurality of copies of the media asset that do not have a copy score, process 800 continues to step 804.

If at step 810 control circuitry 404 determines that there are no copies from the identified plurality of copies of the media asset that do not have a copy score, process 800 optionally continues to step 812. At step 812 process 800 ends.

FIG. 9 depicts an illustrative flowchart of a process 900 for selecting first name 112 from reduced list of names 108 based on the score assigned to the name, in accordance with some embodiments of the disclosure. Process 900 may be executed by control circuitry 404 (e.g., in a manner instructed to control circuitry 404 by the media guidance application). Control circuitry 404 may be part of a remote server separated from the user equipment by way of communications network 514.

Process 900 begins at step 902 when control circuitry 404 selects a third name from reduced list of names 108 based on the score assigned to the name. For example, control circuitry 404 may select "Everybody's Talking," in addition to selecting the name "Everybody's Talkin'". For example, control circuitry 404 may select these two names because they have the same or similar scores.

At step 904, control circuitry 404 generates for display a first selectable option for a user, wherein selecting the first selectable option select the first name. For example, control circuitry 404 may display a selectable option for the name "Everybody's Talkin'"; selecting this first option may allow the user to indicate that "Everybody's Talkin'" is the correct spelling of the name associated with the media asset. Display 412 may be used to display the first selectable option.

At step 906, control circuitry 404 generates for display a second selectable option for the user, wherein selecting the second selectable option select the third name. For example, control circuitry 404 may display a selectable option for the name "Everybody's Talking"; selecting this second option may allow the user to indicate that "Everybody's Talking" is the correct spelling of the name associated with the media asset. Display 412 may be used to display the second selectable option.

At step 908, control circuitry 404 receives an indication that the user selected the first selectable option. For example, control circuitry 404 may receive an indication that the user selected the first selectable option indicating that the name "Everybody's Talkin'" is the correct spelling of the name associated with the media asset. User input interface 410 may be used to receive indication that the user selected the first selectable option.

FIG. 10 depicts another illustrative flowchart of a process 1000 for modifying the spelling of list of names 104 based on a score associated with a first name, in accordance with some embodiments of the disclosure. Process 1000 may be executed by control circuitry 404 (e.g., in a manner instructed to control circuitry 404 by the media guidance application). Control circuitry 404 may be part of a remote server separated from the user equipment by way of communications network 514.

Process 1000 begins at step 1002 when control circuitry 404 receives a media asset. For example, control circuitry 404 may receive the song "Everybody's Talkin'" by the song artist Fred Neil.

At step 1004, control circuitry 404 determines first source 102 of data corresponding to the media asset. For example, control circuitry 404 may determine that several copies of the song "Everybody's Talkin'" are available from the source AllMusic.com.

At step 1006, control circuitry 404 receives, from first source 102 of data, list of names 104, each name in list of names 104 being associated with a respective copy of the media asset. For example, control circuitry 404 may receive list of names 104 from AllMusic.com for the copies of the "Everybody's Talkin'" song containing seven "Everybody's Talkin'" names, two "Everybody's Talking" names, and one "Everybody's Talkin" name. Each of the names is associated with a copy of the media asset, i.e., it is the name of the copy of the media asset as featured in first source 102.

At step 1008, control circuitry 404 generates reduced list of names 108 by retaining one name of each identically spelled name in list of names 104. For example, control circuitry 404 may generate the reduced list comprising only the names "Everybody's Talkin'," "Everybody's Talking," and "Everybody's Talkin."

At step 1010, control circuitry 404 retrieves a criterion from storage 408. For example, control circuitry 404 may retrieve a criterion such as the number of views from storage 408. Other examples of criteria are the date of publication, the publisher, the number of likes, the number of comments, and the like.

At step 1012, control circuitry 404 determines a set of scores corresponding to each name from reduced list of names 108 based on the criterion. Examples of determining the set of scores have been described in greater detail above.

At step 1014, control circuitry 404 selects first name 112 from reduced list of names 108 based on the set of scores. For example, control circuitry 404 may select the name "Everybody's Talkin'" because it has the highest score.

At step 1016, control circuitry 404 modifies the spelling of second name 106 in list of names 104 based on the selected first name. For example, control circuitry 404 may modify the spelling of the name "Everybody's Talkin" to be "Everybody's Talkin'."

It should be noted that processes 600-1000 or any step thereof could be performed on, or provided by, any of the devices shown in FIGS. 2-5. For example, any of processes 600-1000 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-1000 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-5 could be used to perform one or more of the steps in FIGS. 6-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   receiving a list of given names corresponding to a plurality of copies of a media asset;
   identifying a corresponding content source, for each of the plurality of copies of the media asset;
   retrieving a criterion from the corresponding content source;
   generating a reduced list of given names, wherein each of the reduced list of given names comprises a different string of characters;
   for each of the reduced list of given names:
   identifying a plurality of copies associated with each of the reduced list of the given names;
   generating a copy score for each of the identified plurality of copies based on a criterion from the corresponding content source; and
   assigning a highest score from the generated copy scores to one of the reduced list of given names; and
   modifying each of the reduced list of given names that does not match the given name corresponding to the highest assigned score of the generated copy scores.

2. The method of claim 1, wherein identifying the corresponding content source for each of the plurality of copies comprises identifying data from a media guidance application that compiles media assets from a plurality of sources.

3. The method of claim 2, wherein the corresponding content source may provide linear or non-linear programming.

4. The method of claim 1, wherein retrieving the criterion from the corresponding content source comprises:
   requesting, from a memory corresponding to the content source, metadata corresponding to each respective content;
   in response to requesting the metadata, receiving a transmission from the content source comprising the metadata; and
   determining, based on the metadata, the respective criterion.

5. The method of claim 1, wherein the retrieved criterion comprises at least one of a number of views of each of the plurality of copies of the media asset, the date of publication of each of the plurality of copies, the number of likes of each of the plurality of copies, and the number of comments on each of the plurality of copies.

6. The method of claim 1, further comprising:
   identifying a first media asset;
   determining a given name corresponding to the first media asset;
   retrieving, based on the given name, a set of names; and
   identifying a plurality of copies of the media asset that comprise the set of names.

7. The method of claim 6, wherein retrieving the set of names comprises:
   identifying, using a media guidance application, a number of similar strings of characters corresponding to the given name; and
   compiling the similar strings of characters as the set of names.

8. The method of claim 1, wherein generating the copy score comprises:
   retrieving, from storage, a baseline criterion associated with the respective criterion;
   retrieving metadata corresponding to the copy;
   generating a copy score based on the metadata, the baseline criterion, and the respective criterion.

9. The method of claim 1, wherein assigning the highest score from the generated copy scores comprises:
   determining which of the generated copy scores comprises a highest value; and
   associating the highest value with the one of the reduced list of the given names.

10. The method of claim 1, wherein selecting the given name comprises:
    generating a plurality of selectable options corresponding to each given name;
    receiving a selection of one of the plurality of selectable options; and
    identifying a given name corresponding to the selection.

11. A system comprising:
    a communication port;
    a memory storing instructions; and
    control circuitry communicably coupled to the memory and the communication port and configured to execute the instructions to:
    receive a list of given names corresponding to a plurality of copies of a media asset;
    identify a corresponding content source for each of the plurality of copies of the media asset;
    retrieve a criterion from the corresponding content source;
    generate a reduced list of given names, wherein each of the reduced list of given names comprises a different string of characters;
    for each of the reduced list of given names:
    identify a plurality of copies associated with each of the reduced list of the given names;
    generate a copy score for each of the identified plurality of copies based on a criterion from the corresponding content source; and
    assign a highest score from the generated copy scores to one of the reduced list of given names; and
    modify each of the reduced list of given names that does not match the given name corresponding to the highest assigned score of the generated copy scores.

12. The system of claim 11, wherein the control circuitry configured to identify the corresponding content source for each of the plurality of copies is further configured to identify data from a media guidance application that compiles media assets from a plurality of sources.

13. The system of claim 12, wherein control circuitry configured to identify the corresponding content source is further configured to determine whether content source provides linear or non-linear programming.

14. The system of claim 11, wherein the control circuitry configured to retrieve the criterion from the corresponding content source is further configured to:
    request, from a memory associated with the corresponding content source, metadata corresponding to each content;

in response to requesting the metadata, receive a transmission from the content source comprising the metadata; and determine, based on the metadata, the criterion.

15. The system of claim 11, wherein control circuitry configured to retrieve the criterion is further configured to retrieve the criterion comprising at least one of a number of views of each of the plurality of copies of the media asset, the date of publication of each of the plurality of copies, the number of likes of each of the plurality of copies, and the number of comments on each of the plurality of copies.

16. The system of claim 11, wherein the control circuitry is further configured to:
    identify a first media asset;
    determine a given name corresponding to the first media asset;
    retrieve, based on the given name, a set of names; and
    identify a plurality of copies of the media asset that comprise the set of names.

17. The system of claim 16, wherein the control circuitry configured to retrieve the set of names is further configured to:
    identify, using a media guidance application, a number of similar strings of characters corresponding to the given name; and
    compile the similar strings of characters as the set of names.

18. The system of claim 11, wherein the control circuitry configured to generate the copy score is further configured to:
    retrieve, from storage, a baseline criterion associated with the criterion;
    retrieve metadata corresponding to the copy;
    generate a copy score based on the metadata, the baseline criterion, and the criterion.

19. The system of claim 11, wherein the control circuitry configured to assign the highest copy score to the given names is further configured to:
    determine which of the generated copy scores comprises a highest value; and
    associate the highest value with the one of the reduced list of the given names.

20. The system of claim 11, wherein the control circuitry configured to select the given name is further configured to:
    generate a plurality of selectable options corresponding to each given name;
    receive a selection of one of the plurality of selectable options; and
    identify a given name corresponding to the selection.

* * * * *